Sept. 23, 1952  
E. H. SMITH  
PRESSURE-OPERATED ANTIBACKFLOW  
DEVICE FOR CUTTING TORCHES  
Filed July 17, 1948
2,611,424
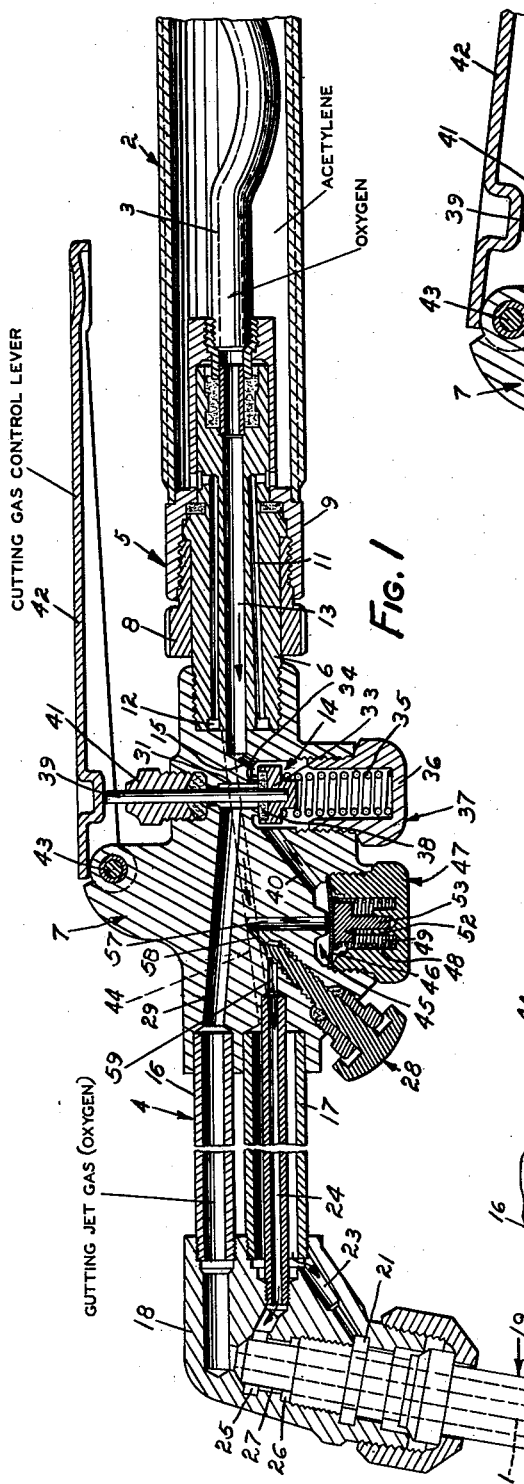
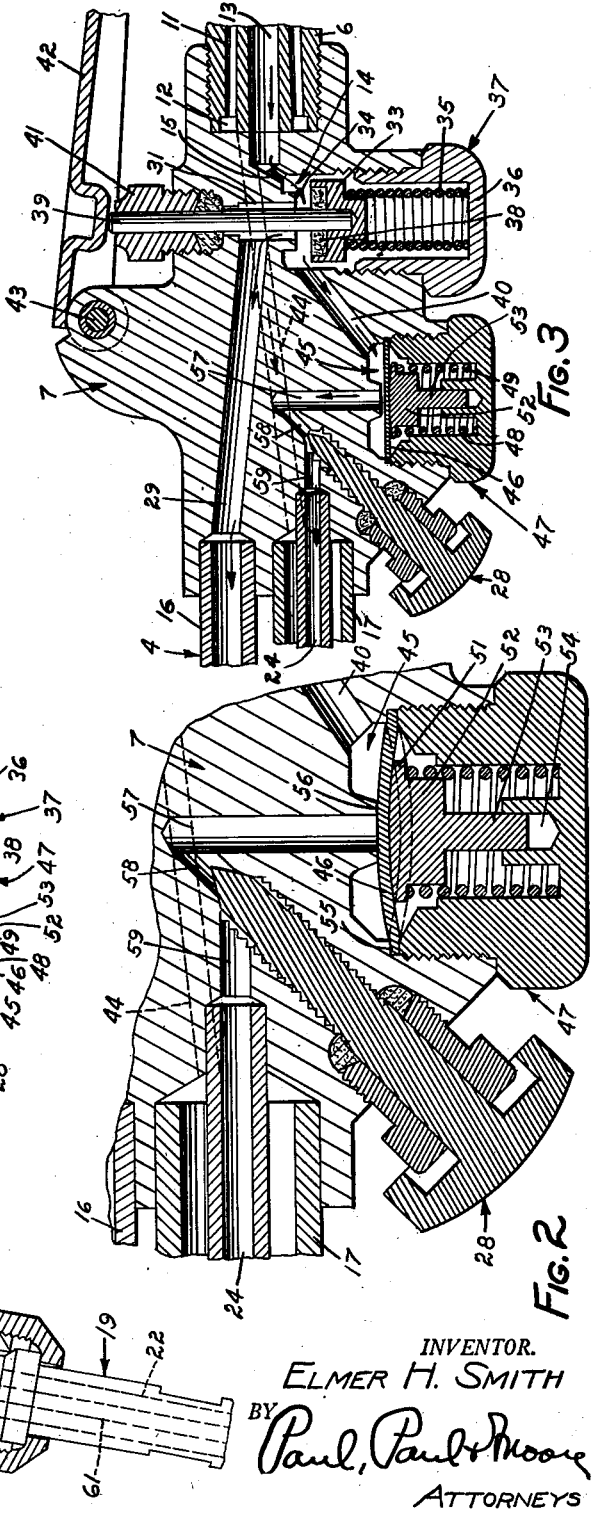
INVENTOR.  
ELMER H. SMITH  
BY Paul, Paul & Moore  
ATTORNEYS Patented Sept. 23, 1952

2,611,424

UNITED STATES PATENT OFFICE 2,611,424

PRESSURE-OPERATED ANTIBACKFLOW DEVICE FOR CUTTING TORCHES

Elmer H. Smith, Minneapolis, Minn., assignor to Smith Welding Equipment Corporation, Minneapolis, Minn., a corporation of Minnesota Application July 17, 1948, Serial No. 39,305

8 Claims. (Cl. 158—27.4)

This invention relates to new and useful improvements in cutting torches, and more particularly to an anti-backflow device adapted to be embodied in a cutting torch to prevent back flow of fuel gases in the oxygen passages of the torch and reaching the cutting valve chamber in the event an abnormal back pressure should develop in the fuel passages of the torch.

Numerous attempts have heretofore been made to produce a cutting torch which may be immune from the damaging effects of a backfire occurring at the tip of the torch, but to the best of my knowledge, none of these have proven entirely satisfactory. It is well known to those familiar with the operation of cutting attachments to a welding torch handle that a backflow of fuel gas may be caused by an excess of pressure on the fuel gas in the torch tip, whereby fuel gas may flow back into oxygen passages to the cutting valve chamber, whereby the cutting valve and its seat may become seriously damaged and the torch temporarily rendered unfit for further use, in the event the backflow fuel gases become ignited, as by a backfire. Other elements and devices connected to and associated with the torch and its gas supply tanks, may also become seriously damaged in the event of a backfire, should the burning fuel gases pass through and beyond the cutting gas control valve of the torch. It is therefore highly desirable that a cutting torch be provided which is so constructed that it will be impossible for the fuel gases to be forced back through the oxygen passages of the torch to the cutting gas control valve and its seat, whereby said valve and seat are positively protected against such hazards.

An object of the present invention therefore is to provide a cutting torch assembly having means embodied therein for positively preventing backflow of gases in the torch, thereby protecting the usual cutting valve and its seat, and other associated parts of the cutting apparatus from becoming damaged from backfire.

A further object is to provide a cutting torch having a tip provided with a plurality of preheating orifices having fuel gas passages for supplying a fuel gas thereto, and the tip also having a cutting gas orifice which is in communication with a gas passage provided in the torch body and having a control valve therein for controlling the flow of cutting gas to the torch tip, and means being provided within the torch for positively preventing a backflow of fuel gases to the cutting valve and its seat, should a back pressure occur at the tip of the torch.

A further object is to provide a cutting torch comprising a valve chamber having a valve therein for controlling the flow of cutting oxygen to the cutting orifice of the tip, and an enlarged chamber being located adjacent to said valve chamber and having a small outlet for establishing communication between said enlarged chamber and the usual preheating orifices of the torch tip, and a flexible spring-actuated element defining a wall of the enlarged chamber and normally closing said outlet when the torch is not in use, said spring-actuated element being adapted to yield from pressure of oxygen delivered to said enlarged chamber from the valve chamber, when the control valve of the torch is open to permit oxygen to flow through the enlarged chamber to the preheating orifices of the torch tip during normal operation of the torch.

A further object is to provide in a cutting torch comprising a cutting gas control valve and a preheating fuel gas passage, a spring-actuated diaphragm which permits gas flow to the tip when the torch is operating, whereby a constant flow of oxygen may be supplied the preheating flame during normal operation of the torch, said diaphragm automatically closing the supply of oxygen to the fuel passage in the event the pressure of the oxygen supply should inadvertently drop to a figure below the pre-set pressure exerted upon the diaphragm, thereby preventing a backflow of fuel gas to the cutting valve and causing a backfire in the torch.

A further object is to provide a cutting torch having a spring loaded diaphragm interposed in the passage for conducting oxygen from the cutting valve chamber to the fuel gas passages of the torch, which diaphragm is normally positioned in engagement with a seat to prevent gas flow to the fuel gas passages, said diaphragm being exposed to the pressure of the oxygen flowing to the pre-heating orifices when the torch is in operation, whereby the diaphragm is retained in open position by the normal flow of oxygen to the preheating orifices, said diaphragm automatically closing the oxygen supply passage to the pre-heating orifices in the event of a drop in pressure in the oxygen supply.

A further object is to provide a cutting torch having a plurality of ducts therein, certain of which deliver a fuel gas such as acetylene and oxygen to the preheating orifices in the torch tip; and a cutting gas passage also being provided in the torch for delivering a cutting gas, such as oxygen, to the central cutting orifice of the tip, and a spring-loaded diaphragm being mounted in the body of the torch and normally closing the oxygen supply passage to the fuel gas passages, but being adapted to yield to oxygen pressure to permit oxygen to flow to the fuel passages under normal operation of the torch; and in the event of a drop in the pressure of the oxygen flowing to the preheating orifices, said diaphragm will automatically interrupt the flow of such oxygen and prevent a backflow of fuel gases from reaching the cutting gas control valve and its seat and thereby preventing a combustible or explosive mixture from forming in the cutting gas passage and cause a backfire in the torch and ignite the combustible seat of the oxygen cutting valve.

A further and more specific object of the invention is to provide a cutting attachment assembly comprising a butt member having means for connecting it to a conventional torch handle and including a torch head having means for detachably supporting a cutting tip therein, said butt member having fuel gas passages therein for delivering a fuel gas to the usual preheating orifices of the torch tip, and a valve chamber being provided in the butt member and having a cutting gas control valve mounted therein for controlling the flow of oxygen to the usual cutting orifice of the torch tip, and an anti-backflow being removably secured in a threaded bore in the butt member and supporting a diaphragm having one side cooperating with the bottom of said bore to provide an enlarged chamber in the butt member; there being a duct in the butt member for conducting oxygen from the valve chamber to said enlarged chamber whereby substantially the entire area of the diaphragm is exposed to the pressure of the oxygen flowing to the preheating orifices of the torch tip, a spring being provided within said plug for constantly urging the diaphragm in a direction to close the outlet from said enlarged chamber to the preheating orifices, the pressure of said spring against the diaphragm being relatively less than the pressure exerted by the oxygen, whereby the diaphragm will yield under pressure of the oxygen and permit oxygen to constantly flow to the preheating orifices through said enlarged chamber during normal operation of the torch, the pre-set load of the diaphragm spring being such that in the event of a drop in the pressure of the oxygen supply, said diaphragm will automatically close said outlet and prevent a backflow of fuel gas from the torch tip from passing through said chamber and reaching the valve chamber and mixing with pure oxygen, which may cause a backfire in the torch.

Other objects reside in the simple and inexpensive construction of the diaphragm supporting means whereby the diaphragm may readily be detached from the torch butt member for inspection, or other purposes, when necessary; in the provision of an anti-backflow device which may be completely assembled independently of the torch body and may readily be secured in position therein without requiring the torch to be taken apart; and in the provision of an anti-backflow device comprising few working parts, whereby it may be manufactured in quantity production at low cost, and which also presents the utmost in simplicity and is extremely accurate in operation.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a longitudinal sectional view of a cutting torch showing the invention embodied therein;

Figure 2 is a fragmentary sectional view on an enlarged scale, showing the diaphragm in its normal closed position; and Figure 3 is a similar view, on a smaller scale, showing the diaphragm partially lifted from its seat by the pressure of the oxygen flowing through the auxiliary chamber to the preheating fuel passages, as when the torch is in operation.

In the selected embodiment of the invention herein disclosed, there is shown in Figure 1, a portion of a tubular member 2 commonly referred to as the torch handle. One end of the handle member 2 is in communication with a source of acetylene under pressure, controlled by a suitable control valve, not shown. An oxygen supply conduit 3 is provided within the tubular member 2 and has one end in communication with a supply of oxygen under pressure. A control valve, not shown, is provided for controlling the flow of oxygen through the conduit 3. The control valves above referred to are well known in the art, and it is therefore deemed unnecessary to herein illustrate the same. It is also to be understood that the pressure of the acetylene and oxygen is automatically controlled by a suitable pressure regulator, not shown, and also well known in the art.

A cutting torch assembly, generally designated by the numeral 4, is shown detachably connected to the adjacent end of the tubular member 2 by a suitable coupling device 5, comprising a nipple 6 received in threaded engagement with the adjacent end of the butt member 7, and having a nut 8 mounted thereon adapted to be received in threaded engagement with the terminal member 9 of the handle 2 to thereby detachably secure the butt member 7 to the handle 2 in leakproof relation.

A plurality of passages 11 are shown extending lengthwise through the nipple 6 and communicate at one end with the interior of the handle 2 and at their opposite ends with an annular groove or cavity 12. An oxygen passage 13 is provided in the nipple 6 and has one end in communication with the oxygen supply conduit 3 and its opposite end in communication with a valve chamber 14 through a short duct 15. The above described parts are more or less well known in the art and therefore need not be further described.

The cutting torch assembly includes the butt member 7, which has the adjacent ends of a pair of conduits 16 and 17 secured therein in leakproof relation. A head 18 is shown secured at the opposite ends of the conduits 16 and 17.

The upper conduit 16 is adapted to conduct a cutting gas such as oxygen from the butt member 7 to the usual cutting orifice of the torch tip 19 not shown in the drawing. The conduit 17 has one end in communication with a supply of acetylene and its opposite end in communication with an annular cavity 21 provided in the torch head 18. The annular cavity 21 is in communication with the inner ends of a plurality of preheating fuel gas ducts 22 which extend lengthwise through the torch tip 19 and terminate in a plurality of preheating orifices at the working end of the tip. A passage 23 establishes communication between the conduit 17 and the annular cavity 21.

In the operation of the torch, oxygen and acetylene are intermixed to provide a combustible fuel mixture for the preheating flame. This is accomplished by mounting within the conduit 17 a small tube 24 having one end in communication with an annular chamber 25 provided in the head 18, and which annular chamber is in direct communication with a second annular chamber 26 through an annular passage 27. This structure is shown and described in Patent No. 1,808,967, granted to Stuart Plumley, June 9, 1931.

The annular chamber 26 is in communication with the upper ends of the fuel gas ducts 22 within the torch tip 19. A suitable needle valve 28 is provided in the butt member 7 for controlling the flow of oxygen to the preheating orifices, as will subsequently be described.

An important feature of the present invention resides in the provision of means in the butt member 7 for preventing backflow of fuel gas through the torch to the cutting gas control valve in the event of a back pressure at the tip of the torch.

A cutting gas passage 29 is provided in the butt member 7 and has one end in communication with the conduit 16 and its opposite end in communication with an upright passage 31 which has its lower end in communication with the valve chamber 14. A spring-actuated valve element 33 is mounted in the valve chamber 14 and is adapted to engage an annular valve seat 34 surrounding the lower end of the upright passage 31. The valve element 33 is normally retained in closing engagement with the valve seat 34 by a suitable spring 35, shown seated against the bottom wall 36 of the valve chamber 14.

The lower portion of the valve chamber is defined by a threaded element 37 having its upper portion received in threaded engagement with a bore in the butt member 7, as clearly illustrated in Figures 1 and 3. To provide a leakproof joint between the valve seat 34 and the valve 33, a sealing element 38 is preferably secured in a recess provided in the upper face of the valve.

The valve chamber 14 is in communication with the passage 13 in the torch handle 2 through the duct 15. A stem 39 has its lower end seated in a recess in the valve 33 and its upper end is guidingly supported in a packing nut 41, received in threaded engagement with the butt member 7, as shown in Figures 1 and 3. The upper end of the stem 39 projects above the guide plug 41 and is engaged by an operating handle 42 pivoted at 43 to the upper portion of the butt member 7, as clearly illustrated in Figures 1 and 3.

The spring 35 normally retains the valve 33 in closing engagement with its seat to cut off the flow of cutting oxygen to the torch tip, when the torch is in operation. The combustible fuel delivered to the preheating orifices consists of predetermined quantities of acetylene and oxygen, as hereinbefore stated. To supply acetylene to the conduit 17, the end thereof secured to the butt member 7 is in communication with the adjacent ends of one or more ducts 44 provided in the butt member. The opposite ends of the ducts 44 are in communication with the annular chamber or cavity 12 in the nipple 6, whereby acetylene may freely flow from the interior of the handle 2 to the preheating orifices, when the usual control valve, not shown, is opened.

The means provided for preventing a backflow of fuel gases through the fuel passages to the valve chamber 14 and causing a backfire in the torch, is shown comprising an enlarged flexible pressure responsive element or diaphragm 46, which is interposed in the fuel passage connecting the valve chamber 14 to the conduit 24 of the torch, whereby said diaphragm may respond to pressure variations in the low pressure oxygen flowing from valve chamber 14 through a passage 40 and conduit 24 to the preheating orifices of the tip.

The duct 40, it will be noted, connects the valve chamber 14 to an enlarged chamber 45, shown provided in the lower portion of the butt member 7. The bottom wall of the enlarged chamber 45 is defined by the flexible element or diaphragm 46, secured in position in the butt member by a suitable plug 47. The plug 47 may be received in threaded engagement with the walls of a bore in the butt member, and has a bore 48 therein upon the bottom wall of which one end of a suitable spring 49 is seated. The upper end of the spring 49 is seated against an outwardly extending flange 51 provided on a diaphragm supporting element 52, having a depending stem 53 received in a guide bore 54 provided in the bottom of the plug 47.

The marginal edge of the diaphragm is firmly clamped against a shoulder 55 provided at the bottom of the threaded socket into which the plug 47 is screwed, whereby the diaphragm provides the bottom wall of the enlarged chamber 45, as hereinbefore described. The chamber 45 has a relatively small outlet 56 and an upright passage 57 connects said outlet to one end of a duct 58, the other end of which provides a valve seat for a needle valve, generally designated by the numeral 28. The duct 58 is in communication with the conduit 24 through duct 59, best illustrated in Figure 2.

When a conventional cutting torch is operating under normal conditions, and the supplies of acetylene and oxygen for the preheating flame are maintained at the required pressures, there is little danger of a backfire occurring in the torch. A backfire may occur, however, should the pressure of the flow of low pressure oxygen to the preheating flame through passages 40, 58, 59, and conduit 24 to the preheating flame drop sufficiently to cause a backflow of fuel gas through said passages to valve chamber 14. Such a contingency may develop due to negligence on the part of the operator, and may result in serious damage to the cutting valve, and other parts of the cutting torch equipment, should the backflow of fuel gas reach the valve chamber 14, particularly if the cutting oxygen control valve is open and permits the backflow of fuel gas to enter the cutting gas passage 29. Under such conditions, should the control valve for the supply of preheating oxygen to conduit 13 be slightly open to permit a slow leak of oxygen into valve chamber 14, such leakage of oxygen will intermix with the backflow of fuel gas and provide a highly combustible mixture which may then enter the cutting gas passage 29 and flow through conduit 16 to the cutting orifice of the tip where it may be ignited and cause a backfire of burning gases through conduit 16 and passage 29 into valve chamber 14, with the resultant destruction of the valve seat 38.

A cutting torch equipped with the novel antibackfire device herein disclosed cannot backfire because when the pressure of the low pressure oxygen through chamber 45 drops below the pressure exerted on diaphragm 46 by spring 49, the diaphragm will automatically close outlet 56 and positively prevent a backflow of such fuel gas from entering said chamber and reaching the cutting valve chamber 14, and thereby cause a backfire in the torch, as above stated.

When the torch is to be used, the usual gas control valves at the back end of the handle 2, not shown on the drawing, are opened to permit acetylene and oxygen to flow to the preheating orifices of the tip to produce the required preheating fuel mixture. As the oxygen enters the enlarged chamber 45 from the valve chamber 14, the pressure of the oxygen against the enlarged surface of the diaphragm in chamber 45 will unseat the diaphragm, as shown in Figure 3, whereby oxygen may freely flow through the ducts 57, 58, 59 and 24 to the preheating orifices in the torch tip, provided, of course, that the control valve 28 is open, as shown in Figure 3. It is to be understood that the pressure of the oxygen is greater than the pre-set pressure or tension exerted against the diaphragm by the spring 49.

Simultaneously, acetylene enters the ducts in the torch tip, as previously described, and intermixes with the oxygen therein to provide a highly combustible fuel mixture which may readily be ignited as it discharges from the preheating orifices of the torch tip. When the fuel mixture thus discharging from the torch tip is ignited, the operator usually manipulates the control valves to obtain a neutral flame, and after such a flame has been obtained, the oxygen control valve 28 may be manipulated to thereby adjust and regulate the preheating flame in accordance with the job to be done.

As soon as the work has been heated to the required temperature, the operator depresses the valve handle 42 of the cutting torch to thereby open the cutting valve 33, as shown in Figure 3, whereby oxygen flows from the supply conduit 13 through the open valve 33, and thence through the cutting gas passage 29, conduit 16, and into the torch head 18, and through the central duct 61 in the torch tip to the cutting orifice thereof, as will be understood by reference to Figure 1.

During the cutting operation, the diaphragm 46 is held out of engagement with its seat 56 by the pressure of the oxygen flowing through the auxiliary chamber 45 to the preheating orifices, and such flow of oxygen may readily be controlled at any time while the torch is in operation by manipulation of the control valve 28.

If, during the operation of the torch, a drop in the oxygen pressure of the supply to the preheating flame should occur, the spring 49 will move the diaphragm into closing engagement with the seat 56 and thus automatically prevent a backflow of the fuel gas from duct 57 into chamber 45, and thence through passage 40 into valve chamber 14, thereby preventing a backfire from occurring in the torch through the duct 40 and into the valve chamber 14, thereby preventing ignition of the rubber valve seat 38, which otherwise might be entirely consumed by a small flow of pure oxygen into the valve chamber 14, before the pressure in the auxiliary chamber 45 could build up sufficiently to open the diaphragm valve 46, as shown in Figure 3. When the duct 57 is thus closed, the pressure of the backflow gases in the duct 57 upon the relatively small central area of the diaphragm will be insufficient to unseat the diaphragm against the pre-set tension in the spring 49, thereby preventing the fuel gases from entering the auxiliary chamber 45 and the valve chamber 14, as hereinbefore stated.

The diaphragm 46 may readily be detached from the torch butt member 7 by simply unscrewing the plug 47 from its socket at the bottom of the butt member, thus making it possible to readily and conveniently inspect the diaphragm and spring 49 when necessary, and also whereby such parts may readily be replaced without special tools.

The embodiment of the anti-backflow device herein disclosed in a cutting torch does not in any way impede the operation of the torch. It will also be noted by reference to Figure 1 that the anti-backflow device does not add materially to the size of the butt member 7, and its location is such that the other working parts of the butt member, such as the control valve 28 and the spring retaining member 37 of the cutting valve 33 may readily be manipulated without interference from the plug 47. The size of the diaphragm 46 is such that it readily responds to the pressure of the oxygen entering the auxiliary chamber 45 from the duct 40, whereby when the usual acetylene and oxygen regulating valves at the back end of the torch handle are opened, as when the torch is to be used, the supply of low pressure oxygen to the fuel gas passages may readily be controlled by manipulation of the control valve 28. The pressure of the oxygen flowing through the enlarged chamber 45 is approximately four pounds per square inch. The enlarged surface area of the diaphragm exposed to the oxygen flowing into chamber 45 from passage 40 causes the diaphragm to respond to the slightest variation in the pressure of the oxygen delivered thereto. The relatively greater surface area of the diaphragm relative to the small area of the outlet from chamber 45, defined by the seat 56, is such that any backflow of fuel gas through passage 57 against the central portion of the diaphragm cannot overcome the pre-set tension of the spring 49 on the diaphragm, whereby such backflow of gases cannot enter chamber 45, as will readily be understood from the foregoing. The anti-backflow device is extremely simple and inexpensive to manufacture as it may be accomplished on automatic machinery and assembled as a composite unit for insertion in the threaded socket or bore provided in the bottom of the butt member 7, as hereinbefore described.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In a torch of the class described, a torch head having a tip removably supported therein and provided with a plurality of preheating orifices and a cutting orifice, a butt member having conduits connecting it to the torch head and providing respectively fuel gas and cutting oxygen passages to the torch tip, a valve chamber in the butt member having a connection with a supply of oxygen under pressure, a valve in said chamber, a threaded socket in the lower portion of the butt member having an enlarged annular seat, a diaphragm positioned on said enlarged annular seat and cooperating with the bottom of said threaded socket to provide an auxiliary gas chamber, a plug received in threaded engagement with the wall of said socket and engaging the diaphragm to secure it in leaktight engagement with said seat, a small valve seat in the bottom of the socket defining the intake of a passage establishing communication between said auxiliary chamber and the fuel gas passage leading to the preheating orifices, said diaphragm normally engaging said valve seat to prevent oxygen flow from the auxiliary gas chamber, substantially the entire surface of one side of said diaphragm being exposed to the pressure of oxygen gas delivered into said auxiliary chamber from the valve chamber whereby the pressure of said oxygen gas unseats the diaphragm and permits oxygen to flow from the auxiliary chamber to the preheating orifices under normal operation of the torch, said diaphragm moving into closing engagement with the valve seat in the event of a drop in the pressure of the oxygen gas delivered to the auxiliary chamber, whereby should a backfire occur at the torch tip and cause a backflow of fuel gas in the torch, the relatively small effective area of the diaphragm exposed to such backflow gas pressure, when the diaphragm is in closed position, will prevent the backflow gases from unseating the diaphragm, and entering the valve chamber.

2. A cutting torch comprising a tip having a plurality of preheating fuel gas ducts therein, a butt member having oxygen and acetylene passages therein, means connecting said passages to the preheating fuel gas ducts in said tip for delivering controlled quantities of low pressure acetylene and oxygen thereto to provide a combustible fuel mixture for a preheating flame, said oxygen passage being connected to an enlarged chamber in said butt member for delivering low pressure oxygen thereto, said chamber having a small outlet opening and which is so arranged that the low pressure oxygen flowing through said passage to the preheating fuel gas ducts in the torch tip must pass through said chamber when the torch is in operation, an enlarged pressure sensitive element in said chamber biased to normally close said outlet when the torch is inoperative, the effective area of said element exposed to the pressure of the low pressure oxygen delivered into said enlarged chamber being relatively greater than the effective area of said outlet, whereby should the pressure of the flow of low pressure oxygen through said chamber suddenly diminish, said diaphragm will automatically close said outlet and prevent a backflow of burning fuel gas from the torch tip from entering said chamber and causing a backfire in the torch.

3. A cutting torch as defined in claim 2, wherein means is provided between the torch tip and said enlarged chamber for regulating the flow of low pressure oxygen from said chamber to the tip.

4. A cutting torch as defined in claim 2, wherein the inlet and outlet openings of said enlarged chamber are located at one side of the pressure sensitive element whereby the low pressure oxygen flowing through said chamber will have no closing influence on said element.

5. An oxy-acetylene torch comprising a tip having a plurality of preheating fuel gas ducts therein, a butt member having oxygen and acetylene passages therein, means connecting said passages to the preheating fuel gas ducts in the torch tip for delivering controlled quantities of low pressure acetylene and oxygen thereto to provide a combustible fuel mixture for a preheating flame, said oxygen passage having a cut-off valve and being connected to an enlarged chamber having a small outlet, said chamber being located in the butt member between the cut-off valve and the torch tip whereby the flow of low pressure oxygen to the preheating fuel gas ducts in the torch tip must pass through said chamber, an enlarged diaphragm in said chamber biased to normally close said outlet when the torch is inoperative, the effective area of said diaphragm exposed to the low pressure oxygen flowing through said enlarged chamber being relatively greater than the effective area of said outlet, whereby should the pressure of the flow of low pressure oxygen through said chamber become lower than the biasing pressure exerted on said element, during operation of the torch, said element is actuated to automatically close said outlet and prevent a portion of the combustible gases discharging from the torch tip from flowing backwards through the low pressure oxygen passage and entering said enlarged chamber, thereby preventing said combustible gases from reaching the valve chamber and there intermixing with pure oxygen which may cause a backfire through the cutting gas passage of the valve chamber with the resultant destruction of the control valve.

6. An oxy-acetylene torch as defined in claim 5, wherein the diaphragm is seated on an annular seat spaced from the bottom of said enlarged chamber and cooperates therewith to form said chamber, said diaphragm being so disposed relative to the inlet and outlet openings of said chamber that it offers substantially no resistance to the flow of oxygen through said chamber during normal operation of the torch.

7. An oxy-acetylene torch comprising a head having a tip supported therein and provided with a plurality of preheating fuel ducts and a cutting gas passage, a butt member, conduits connecting the butt member to the torch head for conveying fuel and cutting gases to the tip, low pressure oxygen and acetylene passages in said butt member connected to supplies of oxygen and acetylene under pressure, cut-off valves in said low pressure oxygen and acetylene passages, means providing an enlarged chamber in said butt member, said chamber being in communication with said oxygen passage and having a wall thereof provided with an annular seat defining a small outlet having a passage connecting it to the conduit for conducting low pressure oxygen from the butt member to the preheating fuel ducts in the torch tip, an enlarged diaphragm forming a wall of said chamber and biased to normally close said outlet when the torch is not in use, the effective surface area of said diaphragm exposed to the flow of oxygen through said chamber being relatively greater than the effective diameter of said outlet, whereby the diaphragm is retained in outlet-opening position during normal flow of low pressure oxygen through said chamber and without restricting said flow, said diaphragm being arranged to automatically close said outlet should the pressure of the low pressure oxygen flowing through said chamber diminish and cause a backfire at the torch tip, thereby preventing the backflow of burning gases to pass through said chamber to the cut-off valve.

8. A cutting torch comprising a tip having a plurality of preheating gas ducts therein, a butt member having a valve chamber therein connected with a source of oxygen under pressure, a cutting gas pasage leading from said chamber to the tip of the torch, a control valve in said chamber, said butt member also having an enlarged chamber therein which is in communication with the valve chamber, said enlarged chamber having a relatively small outlet to which one end of a passage is connected for conducting low pressure oxygen from the enlarged chamber to the preheating orifices of the torch tip, means for delivering acetylene gas to said preheating orifices to intermix with said low pressure oxygen to provide a preheating flame, an enlarged pressure-sensitive element in said chamber biased to normally close said outlet when the torch is inoperative, the effective area of said element exposed to the pressure of the oxygen delivered into said enlarged chamber from the valve chamber being relatively greater than the effective area of said outlet whereby the pressure of the flow of low pressure oxygen through said chamber will retain the element in open position to permit free flow of oxygen through the enlarged chamber to the torch tip to support combustion, during normal operation of the torch, but should the pressure of said oxygen inadvertently be reduced to a point below the biasing force exerted on said element, said element is automatically actuated to close said outlet and prevent a portion of the combustible gases delivered to the torch tip from flowing backwards through the low pressure oxygen passage and entering said enlarged chamber, thereby preventing said combustible gases from reaching the valve chamber and there intermixing with pure oxygen which may cause a backfire through the cutting gas passage to the valve chamber with a resultant destruction.

ELMER H. SMITH.

REFERENCES CITED

The following references are of record in the file of this patent:

UNITED STATES PATENTS

| Number | Name | Date |
|---|---|---|
| 1,139,959 | Fausek et al. | May 18, 1915 |
| 1,151,496 | Pettis | Aug. 24, 1915 |
| 1,874,019 | Mangiameli | Aug. 30, 1932 |
| 2,002,513 | Stockmeyer | May 28, 1935 |
| 2,213,043 | Jacobsen et al. | Aug. 27, 1940 |
| 2,267,104 | Jacobsson et al. | Dec. 23, 1941 |
| 2,296,256 | Bloom | Sept. 22, 1942 |

FOREIGN PATENTS

| Number | Country | Date |
|---|---|---|
| 87,409 | Australia | Feb. 25, 1922 |